United States Patent [19]

Kawashima et al.

[11] Patent Number: 4,677,258
[45] Date of Patent: Jun. 30, 1987

[54] INFORMATION PRODUCING APPARATUS

[75] Inventors: Susumu Kawashima; Nobuo Takahashi, both of Tokyo, Japan

[73] Assignee: Trio Kabushiki Kaisha, Japan

[21] Appl. No.: 819,677

[22] Filed: Jan. 17, 1986

[30] Foreign Application Priority Data

Jan. 22, 1985 [JP] Japan .................................. 60-7106

[51] Int. Cl.$^4$ .......................................... G08C 21/00
[52] U.S. Cl. ..................... 178/18; 340/727;
340/710; 29/834; 29/840; 29/740; 29/701
[58] Field of Search .................. 178/18, 19; 340/727,
340/734, 747, 710, 709, 705, 712, 721, 723, 792,
707, 825.22, 825.23; 364/150, 151, 174, 175,
190, 520; 29/834, 835, 836, 840, 701–703, 740

[56] References Cited

U.S. PATENT DOCUMENTS 4,222,036 9/1980 Troukens ........................ 340/747 X Primary Examiner—Stafford D. Schreyer
Attorney, Agent, or Firm—Gerald J. Ferguson, Jr.; Michael P. Hoffman; Ronni S. Malamud

[57] ABSTRACT

Information producing apparatus for producing position and direction information of chip-like electric parts for use in the chip mount system. This apparatus comprises: a tablet digitizer; X and Y axis position memories to store the X and Y axis position data of the cursor; a menu position memory to store the position of the menu drawing which is divided into many menu spots and is attached on the tablet; a menu spot memory in which data corresponding to the menu spots is stored; a discrimination unit to discriminate whether the cursor is located within the menu drawing or not; and an arithmetic operation unit to calculate the menu spot position corresponding to the cursor position when the cursor exists in the menu drawing. When the cursor is out of the menu drawing, the readout data from the X and Y axis position memories is used as the position information on the printed wiring board of the chip-like electric parts to be installed. When the cursor is in the menu drawing, the readout data from the menu spot memory is used as the attaching direction information in accordance with the menu spot based on the cursor position.

2 Claims, 7 Drawing Figures

INFORMATION PRODUCING APPARATUS

BACKGROUND OF THE INVENTION

1. Field of the Invention

The present invention relates to an information producing apparatus for producing position and direction information of chip-like electric parts for use in a chip mount system in which chip-like electric parts are installed on a printed wiring board.

2. Description of the Prior Art

The chip-mount system in which chip-like electric parts (hereinafter, simple referred to as chip parts) are installed on the printed wiring board comprises at least an apparatus for coating, e g., a paste or adhesive agent and an apparatus for installing the chip parts. The paste or adhesive agent is coated on the surface areas on the conveyed printed wiring board corresponding to the positions where the chip parts are installed. The tape on which the chip parts are adhered is then selected. Predetermined chip parts are peeled off from this tape and are arranged at the positions among predetermined printed wirings on the printed wiring board. The adhesive agent and the like are dried and thereafter this board is dipped into a soldering bath, and thereby installing the chip parts.

However, in the above-mentioned chip mount system, the following various kinds of data must be designated and supplied to the chip mount system with respect to each chip part to be installed' for example, the positions of the parts to be installed, namely, the coordinate positions (X,Y) from the origin on the printed wiring board; the directions of the parts to be installed, namely, the directions of both printed wirings which are connected through the chip parts; the sort of collect for peeling off from the tape the chip parts to be installed and conveying them to the installing positions; the number of reel around which the tape on which the chip parts to be installed are adhered is wound; the coating amount of the paste or adhesive agent; and the like.

Among those respective data, the data other than the coordinate position data and direction data of the chip parts can be fairly easily supplied from an inputting apparatus, for example, a teletypewriter or the like since the number of sorts for the chip parts is small. However, there are a variety of many coordinate position data and there are also a number of kinds of direction data. Therefore, hitherto, the coordinate positions of the chip parts to be installed are measured by a rule from the printed wiring board itself, or the coordinate positions are measured by the rule from the block copy diagram of the printed wiring board and are inputted, and at the same time the directions of the chip parts are discriminated by observing the printed wiring board or block copy diagram. In this manner, those position and direction data are inputted.

Thus, there are problems such that it takes a long time to input those data and when the measured value has a large error, the chip part is installed at the position which is deviated from the normal position.

SUMMARY OF THE INVENTION

The present invention is made in consideration of the above-mentioned problems and it is an object of the invention to eliminate the foregoing problems and provide an information producing apparatus of chip parts in which the coordinate position information and direction information of the chip parts to be installed are produced.

DETAILED DESCRIPTION OF THE PREFERRED EMBODIMENT

Figure 1:
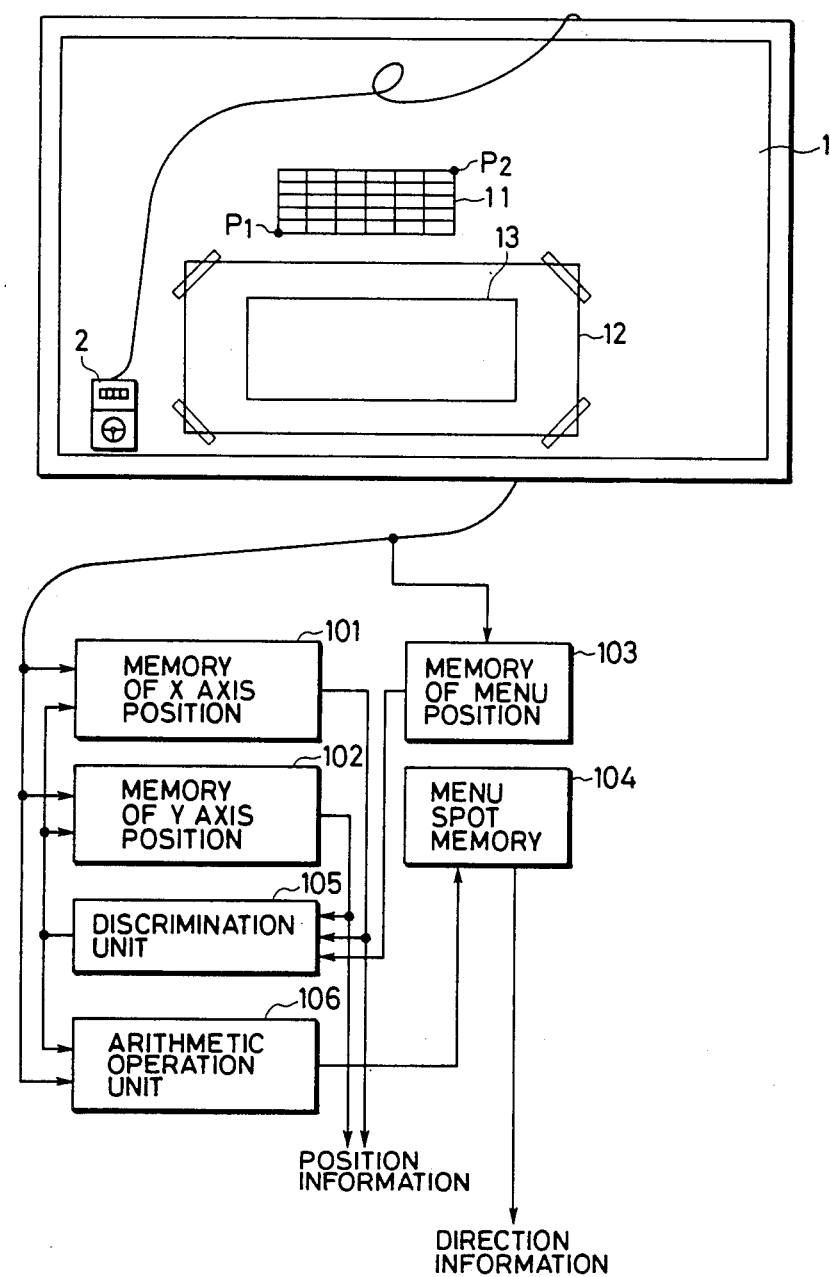
FIG. 1 is a functional block diagram showing an arrangement of the present invention.

The present invention comprises a tablet digitizer 1 as shown in FIG. 1. The tablet digitizer 1 outputs the data at the position of a cursor 2 of the digitizer 1, namely, the position in the direction of an X axis and the position in the direction of a Y axis from the origin of the cursor 2.

In the output data of the tablet digitizer 1, the position data in the X axis direction is stored into a memory 101 of X axis position and the position data in the Y axis direction is stored into a memory 102 of Y axis position.

On the other hand, a menu drawing 11 is movably attached on the tablet surface of the digitizer 1. The menu drawing 11 is divided into a plurality of menu spots and the attaching directions of the chip parts which are installed on the printed wiring board are made correspond to some of the menu spots, respectively. A predetermined data corresponding to each menu spot of the menu drawing 11 is stored in a menu spot memory 104.

The installing position of the menu drawing 11 on the tablet digitizer 1 is stored into a memory 103 of menu position on the basis of an output of the digitizer 1 when the cursor 2 is moved to points $P_1$ and $P_2$ on the diagonal line of the menu 11, respectively.

The memory contents of the memories 101 to 103 are compared by a discrimination unit 105, thereby discriminating whether the cursor 2 is located on the menu drawing 11 or not. When it is determined by the discrimination unit 105 that the cursor 2 is located on the menu 11, it is calculated by an arithmetic operation unit 106 to which one of the menu spots of the menu drawing 11 the cursor position correspond. On the basis of the result of this operation, the memory content corresponding to the menu spot of the result of the operation is read out from the menu spot memory 104. On the contrary, when it is determined by the discrimination unit 105 that the cursor is located out of the menu drawing 11, the memory contents of the memories 101 and 102 are read out.

The cursor 2 is now moved to points $P_1$ and $P_2$ of the menu drawing 11 installed on the tablet of the digitizer 1 and the position of the menu drawing is stored into the memory 103. Thereafter, the cursor 2 is moved to the position out of the menu drawing 11.

In this state, the position of the cursor 2 is stored into the X axis position memory 101 and Y axis position memory 102. Simultaneously, the cursor position is compared with the memory content of the menu position memory 103 by the discrimination unit 105, so that it is decided that the cursor 2 is located out of the menu drawing 11. Thus, the memory contents of the memories 101 and 102 are read out. Now, a drawing 12 on which a block copy diagram 13 of the printed wiring board is drawn is adhered on the tablet digitizer 1. The cursor 2 is moved to the position of the chip part on the block copy diagram 13. Due to this, the position information of the chip part to be installed on the printed wiring board is derived from the memory contents of the memories 101 and 102.

Then, the cursor 2 is moved onto the menu spot on the menu drawing 11 corresponding to the attaching direction of the chip part to be installed on the printed wiring board. Thus, it is determined by the discrimination unit 105 that the cursor is located on the menu drawing 11. The menu spot where the cursor 2 is located is calculated by the arithmetic operation unit 106. Thus, the predetermined data corresponding to the menu spot is read out from the menu spot memory 104. In this case, the cursor exists on the menu spot corresponding to the attaching direction of the chip part and the information corresponding to the attaching direction is obtained.

Figure 2:
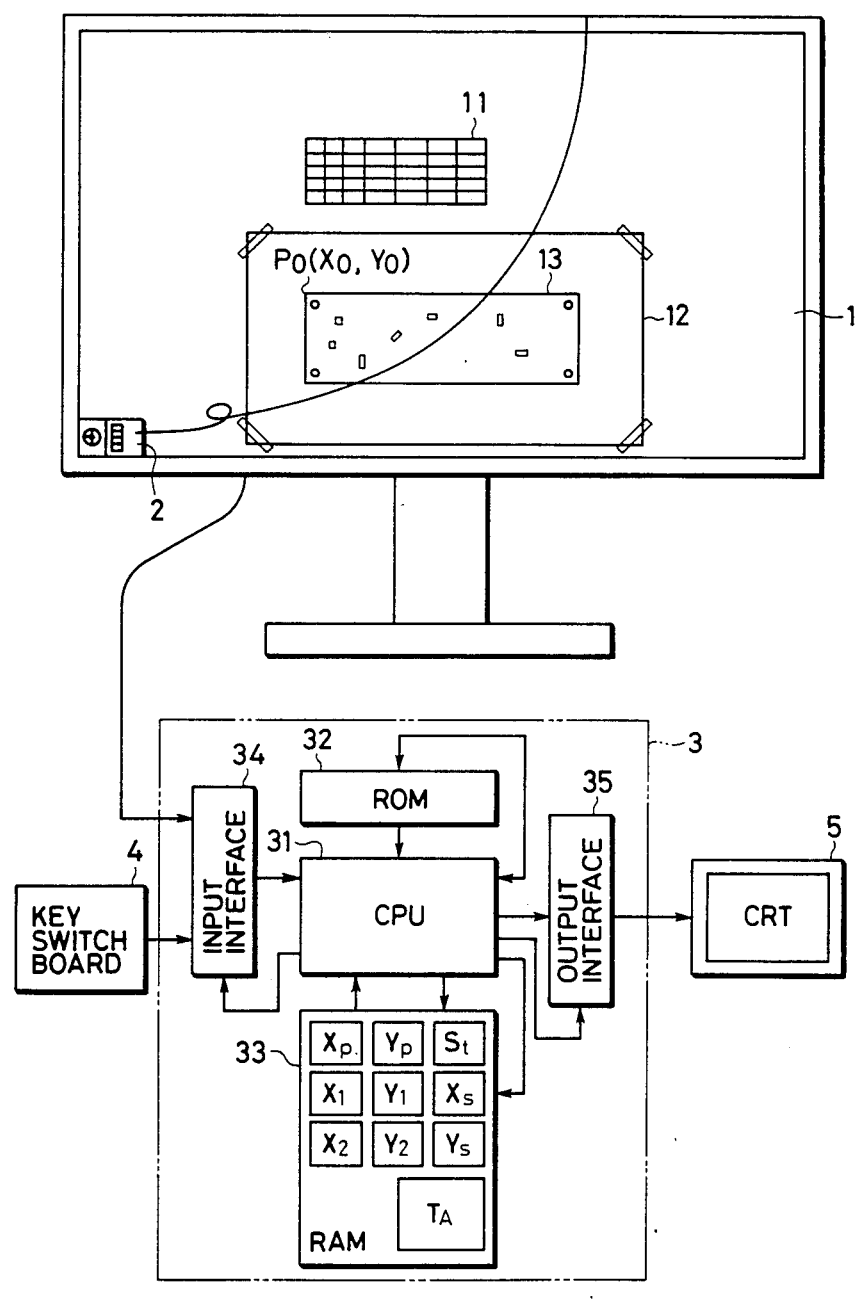
FIG. 2 is a block diagram showing an embodiment of the invention.

FIG. 2 is a block diagram showing an arrangement of an embodiment of the invention.

Numeral 1 denotes the tablet digitizer (hereinafter, simply referred to as the digitizer) and 2 shows the cursor of the digitizer 1. An output of the digitizer 1 is supplied to a microcomputer 3.

The microcomputer 3 comprises: a CPU 31; a ROM 32 in which a program is stored; a RAM 33 in which data or the like is stored; an input interface circuit 34 to which the output from the digitizer 1 and an output from a key switch board 4 are supplied; and an output interface 35 for allowing a CRT display device 5 to display an output. The CPU 31 reads the output of the digitizer 1 or the output of the key switch board 4 through the input interface 34 in accordance with the program stored in the ROM 32 and temporarily stores the output. Then, the CPU 31 performs arithmetic operations and other processes and outputs to the CRT display device 5 through the output interface 35.

Figures 3, 4, 6:
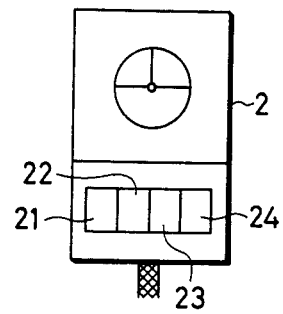
FIG. 3 is a front view of a cursor.
FIG. 4 is a diagram showing an example of a menu drawing.
FIG. 6 is a diagram showing an example of data which is supplied to a chip mount system.

FIG. 3 is a front view of the cursor 2. The cursor 2 has status instruction switches 21 to 24. In this embodiment, the switch 24 instructs the direction menu position reading status which will be explained hereinafter. The switches 21 to 24 instruct the coordinate reading status other than the menu.

FIG. 4 shows an example of the menu drawing 11. As shown in FIG. 1, the menu drawing 11 is movably attached on the tablet of the digitizer 1. On one hand, the drawing 12 on which the block copy diagram 13 of the printed wiring board is drawn is adhered on the tablet of the digitizer In the embodiment of the invention constituted in this manner, the RAM 33 is provided with memory areas $X_p$, $Y_p$, $X_1$, $Y_1$, $X_2$, $Y_2$, $X_s$, $Y_s$, $S_t$, and $T_A$. Although no problem occurs even in the case where the memory areas $X_p$, $Y_p$, $X_1$, $Y_1$, $X_2$, $Y_2$, $X_s$, $Y_s$, and $S_t$ may be registers of the CPU 31, it is assumed in this embodiment that these memory areas are formed in the RAM 33. Values of variables corresponding to two-dimensional variables M(i, j) are stored in the memory area $T_A$. As shown in FIG. 4, the menu drawing 11 is divided into a plurality of menu spots and the attaching directions of the chip parts are diagrammatically shown in some menu spots. In this embodiment, the menu drawing is divided into sixty menu spots and i="1" to "10" and j="1" to "6" and each menu spots corresponds to the two-dimensional variables M(i, j) using the origin $P_1(X_1, Y_1)$ as a reference in FIG. 4.

As well known, the variables correspond to addresses and predetermined data corresponding to each menu spot of the menu drawing 11 is stored in the memory area $T_A$. The memory area $T_A$ forms a table.

Figure 5A:
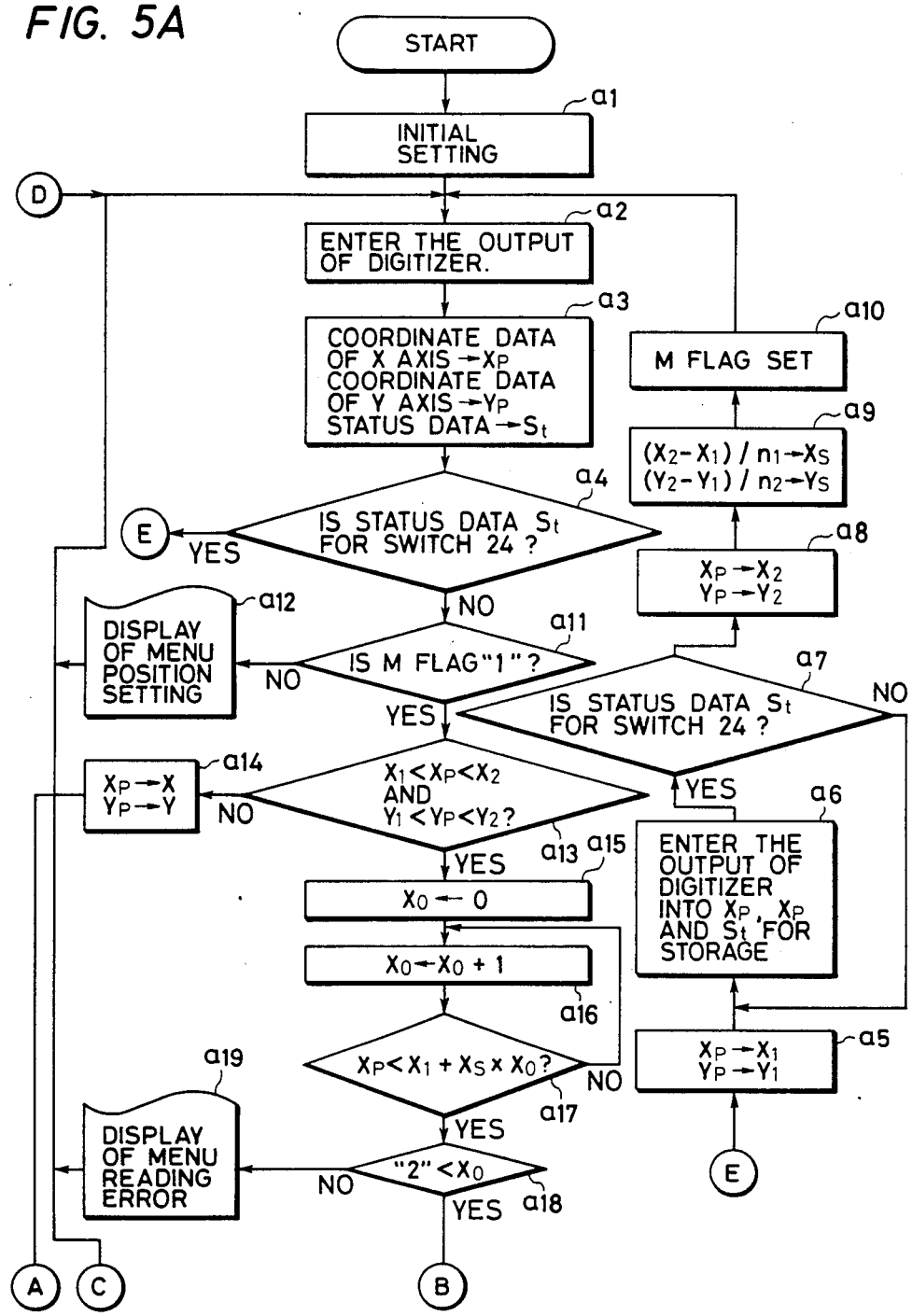
FIGS. 5A and 5B are flowcharts for explaining the operation of an embodiment of the invention.
Figure 5B:
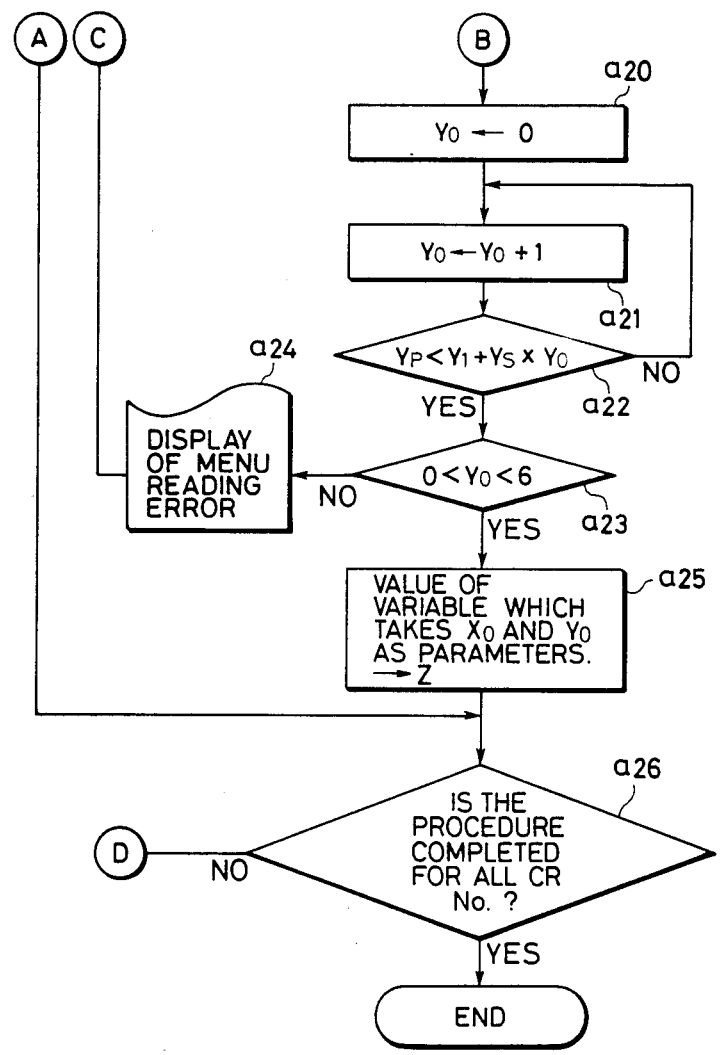

The operation of an embodiment of the invention constituted as mentioned above will then be described in accordance with flowcharts shown in FIGS. 5A and 5B.

When the program is started, the apparatus is initialized (step $a_1$) This initialization includes the setting of the origin ($P_0$) of the block copy diagram 13 of the printed wiring board and the table is formed by storing the predetermined data in the memory area $T_A$.

Although not shown in the flowchart, in step $a_1$, the number (No.) indicative of the sequence, the number (CR No.) of chip part to be installed on the printed wiring board, the sort number (W) of collet for conveying the chip parts, the data (L) corresponding to the thickness of chip part, the number (R) of reel to which the chip parts are adhered, and the data (T) to designate a coating amount of paste are sequentially inputted from the key switch board 4 and displayed in the CRT display device on the basis of the well-known program in accordance with a format shown in, e.g., FIG. 6. In this state, the columns of the coordinate data (X, Y) representative of the position where the chip parts are installed and of the direction data (Z) are blank.

Ordinarily, the coordinate data (X, Y) and direction data (Z) are read in accordance with the sequence of the origin $P_1(X_1, Y_1)$ of the menu drawing 11, the point $P_2(X_2, Y_2)$ on the diagonal line opposite to the origin $P_1$ of the menu drawing 11, and the number (No.) indicative of the sequence.

The cursor 2 is then moved to the position where the data is read and the status instruction switch 21, ..., or 24 is turned on. When the switch 21, ..., or 24 is turned on, the output from the digitizer 1, namely, the X axis coordinate data and Y axis coordinate data indicative of the cursor position, and the status data corresponding to the status instruction switch 21, ..., or 24 are read (step $a_2$). The X axis coordinate data, Y axis coordinate data, and status data are temporarily stored into the memory areas $X_p$, $Y_p$, and $S_t$, respectively (step $a_3$). Subsequent to step $a_3$, a check is made to see if the switch 24 has been turned on or not from the memory content of the memory area $S_t$ (step $a_4$) When it is detected that the switch 24 has been turned on in step $a_4$, data stored in the memory area $X_p$ is copied into the memory area $X_1$ and at the same time, the data stored in the memory area $Y_p$ is copied into the memory area $Y_1$ (step $a_5$) This means that it is decided that the cursor 2 just before the switch 24 is first turned on is located at the origin position $P_1$ of the menu drawing 11. Subsequent to step $a_5$, similarly to steps $a_2$ and $a_3$, the cursor position which is set next and the output of the status instruction switch 21, ..., or 24 are inputted and stored into the memory areas $X_p$, $Y_p$, and $S_t$ (step $a_6$) Subsequently, a check is made to see if the switch 24 has been turned on or not from the memory content of the memory area $S_t$ (step $a_7$) If it is decided that the switch 24 is not turned on in step $a_7$, the cursor 2 is again set and the apparatus waits until the switch 24 is turned on (steps $a_6$ and $a_7$). If it is detected in step $a_7$ that the switch 24 has been turned on, the data stored in the memory area $X_p$ is copied into the memory area $X_2$ and the data stored in the memory area $Y_p$ is copied into the memory area $Y_2$ (step $a_8$). This means that it is determined that the cursor immediately before the switch 24 is turned on at the second time is located at the position $P_2$ ($X_2$, $Y_2$) of the menu drawing 11. Thus, the position of the menu drawing 11 is read upon completion of step $a_8$.

After step $a_8$, it is assumed that the storage data in memory area $X_1$ is "$X_1$", the storage data in the memory area $Y_1$ is "$Y_1$", the storage data in the memory area $X_2$ is "$X_2$", the storage data in the memory area $Y_2$ is "$Y_2$", the number of menu spots in the direction of the X axis of the menu drawing 11 is $n_1$ ($n_1=10$ in the example shown in FIG. 4), and number of menu spots in the direction of the Y axis of the menu drawing 11 is $n_2$ ($n_2=6$ in the example shown in FIG. 4). In this case, the operation of ("$X_2$"−"$X_1$")/$n_1$ is executed and the result of this operation is stored into the memory area $X_s$ and the operation of ("$Y_2$"−"$Y_1$")/$n_2$ is carried out and the result of this operation is stored into the memory area $Y_s$ (step $a_9$). The storage data "$X_s$" in the memory area $X_s$ corresponds to the length in the X axis direction of one menu spot of the menu drawing 11. The storage data "$Y_s$" in the memory area $Y_s$ corresponds to the length in the Y axis direction of one menu spot. After step $a_9$, "1" is set into a flag area M provided into the RAM 33 to indicate that the menu positions were set (step $a_{10}$). Then, the procedure is again executed from step $a_2$.

On the contrary, when it is detected in step $a_4$ that switch 24 is not turned on, a check is made to see if "1", i.e., the flag has been set into the flag area M or not (step $a_{11}$). When it is detected in step $a_{11}$ that no flag is set, the menu position setting indication is displayed (step $a_{12}$) after step $a_{11}$ and the procedure is again executed from step $a_2$.

When it is detected in step $a_{11}$ that the flag has been set, it is then checked (in step $a_{13}$) to see if the storage data "$X_p$" in the memory area $X_p$ lies within the range from the storage data "$S_1$" in the memory area $X_1$ to less than the storage data "$X_2$" in the memory area $X_2$ and at the same time the storage data "$Y_p$" in the memory area $Y_p$ lies within the range from the storage data "$Y_1$" in the memory area $Y_1$ to less than the storage data "$Y_2$" in the memory area $Y_2$ or not. The discriminating step $a_{13}$ corresponds to the discriminating step to see if the cursor 2 is located in the menu drawing 11 or not. When it is determined in step $a_{13}$ that the storage data "$X_p$" in the memory area $X_p$ or the storage data "$Y_p$" in the memory area $Y_p$ lies out of the range in step $a_{13}$, the storage data "$X_p$" in the memory area $X_p$ and the storage data "$Y_p$" in the memory area $Y_p$ are copied into the predetermined addresses X and Y in a video RAM are provided in the RAM 33, respectively, (step $a_{14}$). It will be understood that the predetermined addresses in step $a_{14}$ correspond to the numbers indicative of the sequence in FIG. 6.

When it is determined in step $a_{13}$ that the storage data "$X_p$" in the memory area $X_p$ and the storage data "$Y_p$" in the memory area $Y_p$ lie within the ranges in step $a_{13}$, "0" is set into a register $X_0$ subsequent to step $a_{13}$ (step $a_{15}$). Then, "+1" is added to the content of the register $X_0$ (step $a_{16}$). After step $a_{16}$, a check is made to see if (storage data "$X_1$"+storage data "$X_s$" in the memory area $X_s$ x content "$X_0$" of the register $X_0$) exceeds the storage data $X_p$ or not (in step $a_{17}$). If YES in step $a_{17}$, a check is then made to see if the content of the register $X_0$ exceeds "2" or not (step $a_{18}$). This discrimination is performed to remove the case where the sort column shown in FIG. 4 was designated. If the content of the register $X_0$ is "2" or less in step $a_{18}$, this means that the cursor was moved to the portion of the sort column shown in FIG. 4. In this case, the menu reading error is displayed (step $a_{19}$) and the procedure is again executed from step $a_2$.

When it is determined in step $a_{18}$ that the content of the register $X_0$ exceeds "2", the procedure advances to the flowchart shown in FIG. 5B and "0" is set into a register $Y_0$ (step $a_{20}$) after step $a_{18}$. Then, "+1" is added to the content of the register $Y_0$ (step $a_{21}$). In the next step $a_{22}$, a check is made to see if (storage data "$Y_1$"+storage data "$Y_s$" in the memory area $Y_s$ x content "$Y_0$" of the register $Y_0$) exceeds the storage data $Y_p$ or not. If YES in step $a_{22}$, a check is made to see if the content of the register $Y_0$ exceeds "0" and is also less than "6" or not (step $a_{23}$). This discrimination is carried out to remove the case where the Z column (top line) shown in FIG. 4 was designated. Unless 0<"$Y_0$"<6 in step $a_{23}$, this means that the cursor was moved to the portion of the Z column (top line) shown in Fig. 4. In this case, the menu reading error is displayed (step $a_{24}$) and the procedure is again executed from step $a_2$.

When 0<"$Y_0$"<6 in step $a_{23}$, it means that ("$X_0$", "$Y_0$") is the menu spot which is indicated by the cursor 2 which was moved within the range of M (3, 1), M (3, 5), M (10, 1) and M (10, 5) in the menu drawing 11 on the basis of the content "$X_0$" of the register $X_0$ and the content "$Y_0$" of the register $Y_0$. Thus, after step $a_{23}$, the values of the twodimensional variables M ($X_0$, $Y_0$) are read out from the table stored in the memory area $T_A$ using the contents "$X_0$" and "$Y_0$" of the registers $X_0$ and $Y_0$ as parameters, and these values are copied into a predetermined address Z in the video area provided in the RAM 33 (step $a_{25}$). It will be understood that the predetermined address Z in step $a_{25}$ corresponds to the number indicative of the sequence in FIG. 6.

When the cursor is set to the position of a resister $R_{23}$ after the position of the menu drawing 11 was stored, by executing step $a_{14}$, the coordinate data corresponding to the data "$X_p$" and "$Y_p$" is displayed in the X and Y columns of the CR No. $R_{23}$ in FIG. 6, respectively. This data is the position data on X and Y axes of the resistor $R_{23}$. For example, in attached, the cursor 2 is moved to the position of the columns (A) and (0) in the menu drawing 11 shown in FIG. 4. Then, by executing step $a_{25}$, the direction data corresponding to the two-dimensional variables M ("$X_0$", "$Y_0$") is displayed in the Z column of the CR No. $R_{23}$.

Subsequent to steps $a_{14}$ and $a_{25}$, a check is made to see if all the procedure has been completed or not (step $a_{26}$). Namely, the procedure is repeated until the coordinate data X and Y and direction data Z are produced with respect to the CR No. of the chip part corresponding to the final number indicative of the sequence shown in FIG. 6.

Thus, the coordinate data X and Y and direction data Z in FIG. 6 are obtained. By supplying these data to the chip mount system, predetermined chip parts can be automatically installed at predetermined positions on the printed wiring board.

In addition to that the attaching directions of the chip parts are diagrammatically shown as an example in FIG. 4, alphabetic characters, numerals, symbols and the like may be displayed for respective menu spots of the menu drawing shown in FIG. 4. The table of the format shown in FIG. 6 may be also formed by only the digitizer 1 by the table data corresponding to each menu spot.

Further, together with the indication as shown in FIG. 6, or in place of the indication, the output of the microcomputer 3 may be directly supplied to, e.g., a teletypewriter to make a punched tape, and each data may be supplied to the chip mount system by this punched tape.

On the other hand, no problem will be caused even if the position of the menu drawing 11 is changed to any position other than the position shown in Fig. 2 due to reasons of the size of the drawing 12 or the like. In this case, there is no need to change the program shown in FIG. 5.

As described above, according to the present invention, the position information in the directions of the X and Y axes of the chip parts to be installed on the printed wiring board can be obtained by the output of the digitizer. There is no need to measure the positions by the rule. Also, by moving the cursor to the position on the menu drawing, the direction information of the chip parts to be installed can be obtained. In addition, the accuracy of information is improved than the conventional one.

What is claimed is:

1. An apparatus comprising:
    a tablet digitizer;
    menu position memory means for storing a position of a menu drawing attached on a tablet of said tablet digitizer, said menu drawing being divided into a plurality of menu spots;
    menu spot memory means in which predetermined data is stored in correspondence to each of said menu spots; and
    means responsive to the position of a cursor on the menu spot for identifying the data of said menu spot memory means.

2. An information producing apparatus comprising:
    a tablet digitizer;
    memory means of X axis position and Y axis position for storing data corresponding to the position in the direction of the X axis of a cursor of said tablet digitizer and data corresponding to the position in the direction of the Y axis of said cursor, respectively;
    menu position memory means for storing a position of a menu drawing attached on a tablet of said tablet digitizer, said menu drawing being divided into a plurality of menu spots;
    menu spot memory means in which predetermined data is stored in correspondence to each of said menu spots;
    discriminating means for comparing memory contents of said memory means of X axis position and Y axis position with a memory content of said menu position memory means and thereby discriminating whether or not said cursor is located within the menu drawing; and
    arithmetic operating means for calculating the position of the menu spot corresponding to the position of the cursor when it is determined that the cursor is located within the menu drawing by said discriminating means,
    wherein in the case where the cursor is located out of the menu drawing, the data read out from said memory means of X axis position and Y axis position is used as position information on a printed wiring board of chip-like electric parts which are installed, and in the case where the cursor is located within the menu drawing, the data read out from said menu spot memory means is used as attaching direction information of the chip-like electric part in accordance with the menu spot corresponding to the cursor position.

* * * * *